United States Patent
Cook et al.

(10) Patent No.: US 6,516,511 B1
(45) Date of Patent: Feb. 11, 2003

(54) POSITION SENSOR FOR PISTON RING COMPRESSOR

(75) Inventors: James A. Cook, Delphi, IN (US); Brad A. Moore, Frankfort, IN (US); Kevin R. Shaffer, West Lafayette, IN (US); James L. Thien, Logansport, IN (US); Robert L. Walters, Lafayette, IN (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/606,069

(22) Filed: Jun. 29, 2000

(51) Int. Cl.[7] ............................................. B23Q 15/00
(52) U.S. Cl. ............................ 29/720; 29/222; 29/269
(58) Field of Search ........................... 29/222, 244, 224, 29/269, 720, 888.01, 888.06, 888.07, 888.04, 714, 721, 407.09, 407.1, 281.5; 33/DIG. 15, 600, 605, 520, 644

(56) References Cited

U.S. PATENT DOCUMENTS

| | | | | |
|---|---|---|---|---|
| 1,521,119 A | * | 12/1924 | Murphy | 33/605 |
| 1,572,801 A | * | 2/1926 | Kearney | 29/222 |
| 1,706,780 A | * | 3/1929 | Greene | 29/222 |
| 2,553,663 A | * | 5/1951 | Martin | 29/222 |
| 2,655,719 A | * | 10/1953 | Nelson | 29/222 |
| 2,697,870 A | * | 12/1954 | Zucker | 29/222 |
| 2,922,222 A | * | 1/1960 | Jones | 29/717 |
| 3,174,215 A | * | 3/1965 | Huigens et al. | 29/222 |
| 3,374,526 A | * | 3/1968 | Kyser | 29/222 |
| 3,561,091 A | * | 2/1971 | Pigozzi | 29/222 |
| 3,571,898 A | * | 3/1971 | Fuhrmann | 29/407.06 |
| 3,754,312 A | * | 8/1973 | Komorek | 29/222 |
| 3,785,058 A | * | 1/1974 | Egli | 33/701 |
| 3,793,718 A | * | 2/1974 | Okazaki | 29/256 |
| 3,813,755 A | * | 6/1974 | Maskell et al. | 29/252 |
| 3,952,393 A | * | 4/1976 | Van Ravenzwaay et al. | 29/795 |
| 3,975,830 A | * | 8/1976 | Lopacki | 33/520 |
| 4,194,383 A | * | 3/1980 | Huzyak | 72/245 |
| 4,196,523 A | * | 4/1980 | Nagata et al. | 33/504 |
| 4,379,234 A | * | 4/1983 | Cruz | 250/559.37 |
| 4,447,956 A | * | 5/1984 | Chung | 33/520 |
| 4,520,542 A | * | 6/1985 | Villanyi | 29/224 |
| 4,843,697 A | * | 7/1989 | Marshall | 29/888.01 |
| 4,887,341 A | * | 12/1989 | Sakimori et al. | 29/888.01 |
| 4,899,643 A | * | 2/1990 | Hvilsted et al. | 92/5 R |
| 5,303,465 A | * | 4/1994 | Fujimoto et al. | 29/791 |
| 5,404,629 A | * | 4/1995 | Liechty et al. | 29/222 |
| 5,435,056 A | * | 7/1995 | Liechty etal. | 29/771 |
| 5,539,981 A | * | 7/1996 | Burchan et al. | 29/888.061 |
| 5,592,740 A | * | 1/1997 | Liechty et al. | 29/888.044 |
| 5,619,782 A | * | 4/1997 | Tanaka et al. | 29/407.1 |
| 5,737,831 A | * | 4/1998 | Liechty et al. | 29/771 |
| 6,047,472 A | * | 4/2000 | Koch et al. | 29/888.01 |
| 6,367,141 B1 | * | 4/2002 | Cook et al. | 29/407.1 |
| 6,389,667 B1 | * | 5/2002 | Cook et al. | 29/222 |

FOREIGN PATENT DOCUMENTS

| | | | | |
|---|---|---|---|---|
| JP | 401103238 | * | 4/1989 | 29/222 |
| JP | 408243858 | * | 9/1996 | B23P/19/02 |

* cited by examiner

Primary Examiner—Gregory M. Vidovich
Assistant Examiner—Essama Omgba
(74) Attorney, Agent, or Firm—Andrew M Calderon

(57) ABSTRACT

A piston ring compressor having position sensors for aligning a piston assembly with a cylinder of an engine block. The position sensors enable a piston assembly to be properly aligned with the cylinder prior to inserting the piston assembly into the cylinder without damaging either the piston assembly or the cylinder. The position sensors are linear variable distance transducer which are used to align the centerline of the piston ring compressor with the centerline of the cylinder.

9 Claims, 2 Drawing Sheets

POSITION SENSOR FOR PISTON RING COMPRESSOR

TECHNICAL FIELD

This invention relates generally to a position sensor and, more particularly, to a position sensor for positioning and aligning a piston assembly with relation to a cylinder of an internal combustion engine.

BACKGROUND ART

Internal combustion engines include many components which need to be assembled in a very precise manner. This precise manner of assembly ensures that the internal combustion engine is efficiently working within its design parameters. However, the assembly of an internal combustion engine is difficult even for the most experienced technician, taking many hours or even days to properly assemble the many components.

In assembling an internal combustion engine, the technician manually performs many of the assembly steps, even those steps which require aligning heavy and awkward components with the engine block. By way of example, a technician must align the piston assemblies with respective cylinders of an engine block prior to inserting the piston assemblies within the cylinders. In order to perform this task, the technician first assembles the piston assembly by connecting a connecting rod to the piston head with a pin and placing rings within grooves of the piston crown. Thereafter, the technician places the piston and rings within a piston ring compressor which compresses the piston rings within the grooves of the piston crown. This allows the piston assembly to be properly inserted within the cylinder.

Once the piston assembly is inserted within the piston ring compressor, the technician manually lifts the piston assembly and aligns the piston with the cylinder. This is a very difficult assembly step, especially since the combination of the piston ring compressor and piston assembly may weigh upwards of twenty five kilograms (approximately fifty (50) pounds) or more in those cases when the piston assembly is used in large internal combustion engines.

In order to solve this problem, a second technician may assist in either the lifting or aligning steps. In the aligning step, the second technician typically stands behind the engine block and guides the connecting rod through the cylinder, proximate to the crankshaft. However, during this alignment step, the head of the piston assembly may not be properly aligned with the cylinder. This is a common occurrence since the guidance of the connecting rod through the cylinder does not align the piston head with the cylinder. Due to the misalignment of the piston with the cylinder, the skirt of the piston may scrape against the cylinder liner or face of the engine block prior to being inserted within the cylinder. This can cause damage to the piston and, in some instance, may require the connecting rod to be removed from the cylinder so that the piston assembly can be replaced with a new piston assembly and realigned with the cylinder of the engine block.

The use of the second technician and the need to replace and realign the piston assembly adds to the cost of manufacturing the engine, itself. These higher manufacturing costs are then passed along to the consumer by raising the cost of the machine which utilizes such engine.

The present invention is directed to overcoming one or more of the problems as set forth above.

DISCLOSURE OF THE INVENTION

In one aspect of the present invention a piston ring compressor having a sensor mounted thereon is provided. The sensor determines a position of the piston ring compressor with relation to the cylinder of the engine block.

BEST MODE FOR CARRYING OUT THE INVENTION

Figure 1:
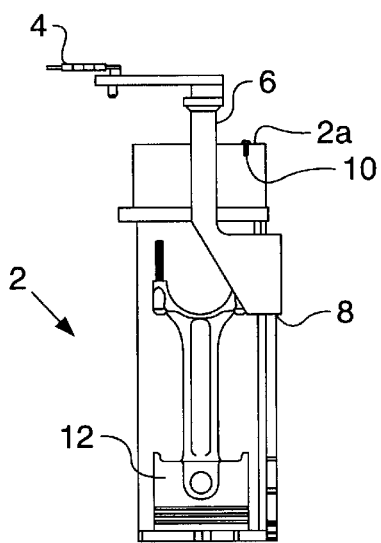
FIG. 1 shows a diagrammatic front plan view of a piston ring compressor having sensors of the present invention.

Referring to FIG. 1, a piston ring compressor 2 preferably shaped as a barrel is shown. An outward extending arm 6 is slideably mounted on the piston ring compressor 2 via a sliding mechanism 8, and at least one position sensor 4 is mounted to the outward extending arm 6. The position sensors 4 may also be pivotally mounted to the piston ring compressor 2. The position sensor 4 is preferably a linear variable distance transducer; however, those skilled in the art should recognize that the position sensor 4 is not limited to a linear variable distance transducer, but may be any known position sensor such as, for example, an ultrasonic sensor.

FIG. 1 further shows at least one proximity sensor 10 extending from the piston ring compressor 2. The proximity sensor 10 may be a laser based sensor, or other sensor well known in the art. A piston assembly 12 is placed within the piston ring compressor 2, but is not critical to the understanding of the present invention.

Figure 2:
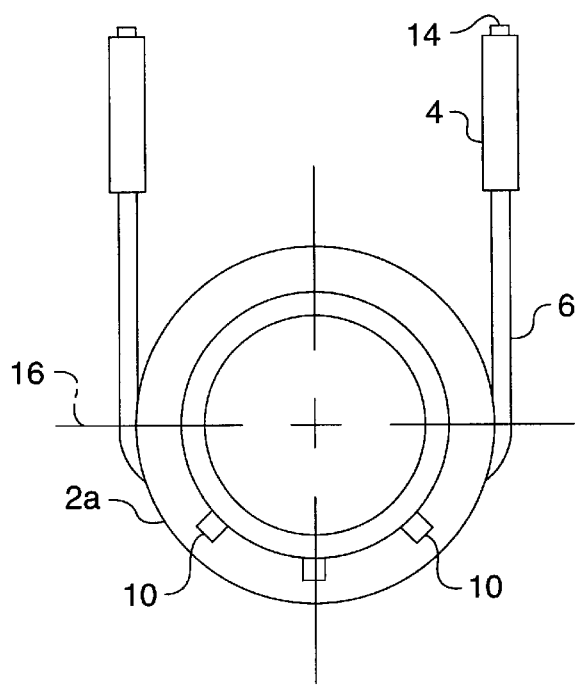
FIG. 2 shows a diagrammatic top plan view of the piston ring compressor.

FIG. 2 shows a diagrammatic top plan view of the piston ring compressor 2. In this view, two position sensors 4 are located about the circumference of the piston ring compressor 2; however, more than two position sensors 4 may equally be used with the piston ring compressor 2. The position sensors 4 may include a light 14 or other similar mechanism. FIG. 2 further shows several proximity sensors 10 and a centerline 16 of the piston ring compressor 2.

Figure 3:
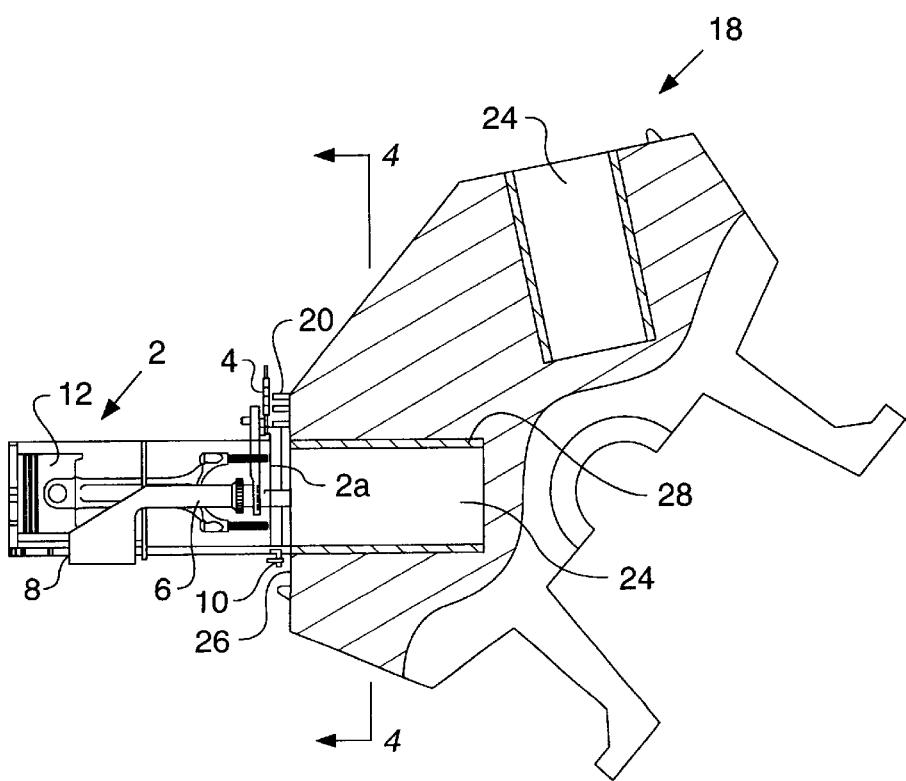
FIG. 3 shows a diagrammatic side view of the piston ring compressor placed proximate to an engine block.

FIG. 3 shows the position sensors 4 in close proximity to an engine block 18, and preferably in proximity to head bolts 20 of the engine block 18. In this figure, the piston ring compressor 2 is in a horizontal position and a centerline 22 of a cylinder 24 is parallel with the centerline 16 of the piston ring compressor 2. A contacting face 2a of the piston ring compressor 2 is flush with a facing surface 26 of the engine block 18 (i.e., the piston ring compressor 2 does not have to be tilted in either the right of left direction). FIG. 3 also shows the proximity sensors 10 in close proximity with the engine block 18.

Figure 4:
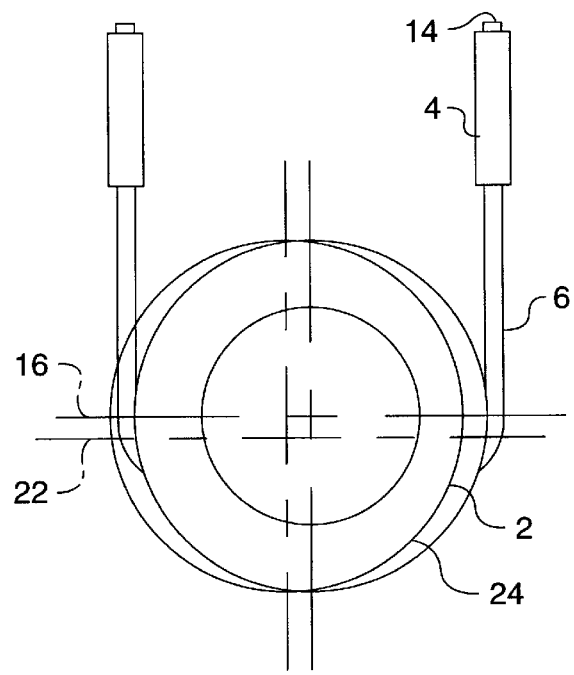
FIG. 4 shows a view of the piston ring compressor along line 4—4 of FIG. 3.

FIG. 4 shows a view of the piston ring compressor 2 along line 4—4 of FIG. 3. In this view, the centerline 16 of the piston ring compressor 2 is parallel with the centerline 22 of the cylinder 24. However, it is shown that the centerline 16 of the piston ring compressor 2 is not aligned with the centerline 22 of the cylinder 24.

Figure 5:
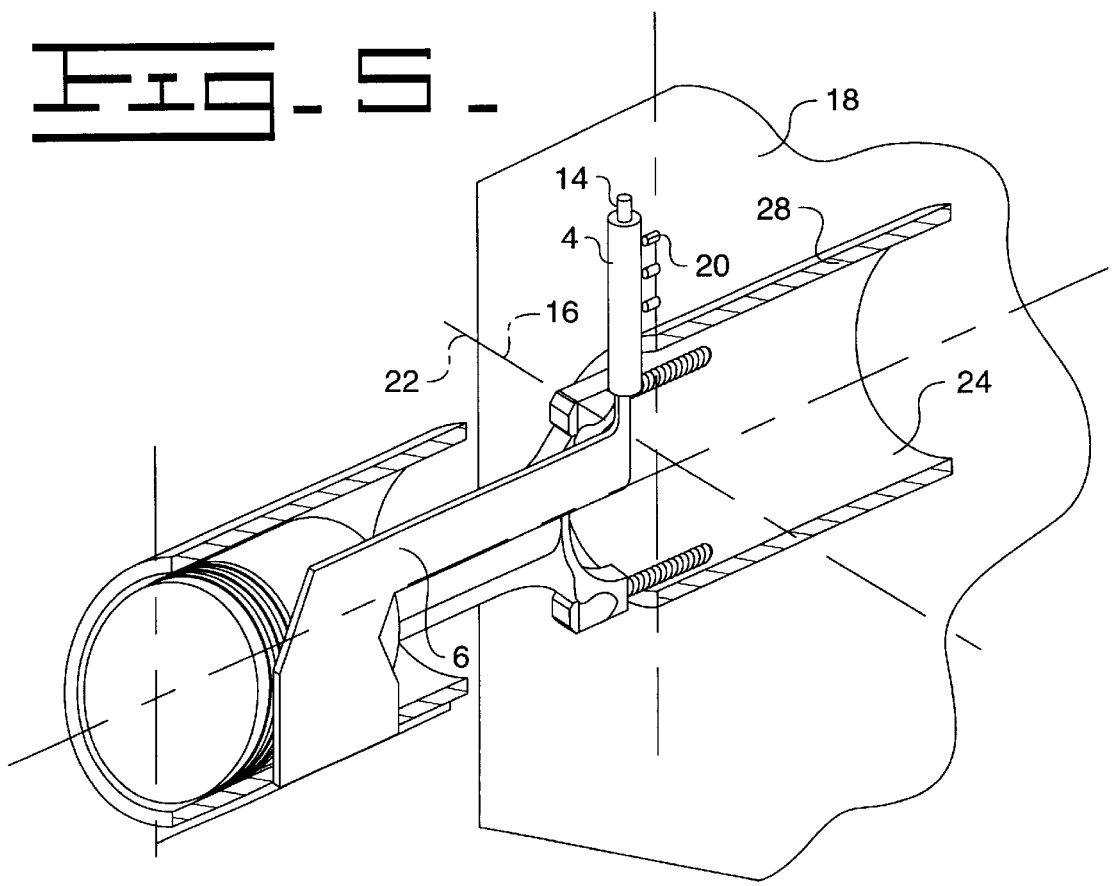
FIG. 5 shows an enlarged isometric view of the piston ring compressor in alignment with a cylinder of the engine block of FIG. 3.

FIG. 5 shows an enlarged isometric view of the piston ring compressor in alignment with the cylinder 24 of the engine block 18. In this view, the position sensors 4 are attached to or are in close proximity to a predetermined location of the engine block 18 and preferably an edge of a cylinder liner 28. FIG. 5 also shows the centerline 22 of the cylinder 24 parallel and aligned with the centerline 16 of the piston ring compressor 2.

INDUSTRIAL APPLICABILITY

In operation, the position sensors 4 determine whether the piston ring compressor 2 is in proper alignment with the engine block 18. That is, the position sensors 4 determine whether the centerline 16 of the piston ring compressor 2 is aligned with the centerline 22 of the cylinder 24 of the engine block 18.

First, the centerline 22 of the cylinder 24 is initially placed parallel with the centerline 16 of the piston ring compressor 2. The piston ring compressor 2 slides toward the engine block 18 while the arm 6 of the position sensor 4 remains stationary. The sliding mechanism 8 allows both the position sensor 4 and the proximity sensors 10 to be in close proximity or in contact with the engine block 18 prior to inserting the piston assembly 12 into the cylinder 24. At this operational stage, the proximity sensors 10 are used to determine when the piston ring compressor 2 is in close proximity to the engine block 18, and more preferably, when the facing surface 26 of the engine block 18 is about contacting the contacting face 2a of the piston ring compressor 2.

The position sensors 4 are aligned with the head bolt 20 of the engine block 18. At this operational stage, the piston ring compressor 2 is roughly aligned with the cylinder 24. The position sensors 4 then determine whether the piston ring compressor 2 is in axial alignment with the cylinder 24, or whether the piston ring compressor 2 is tilted to the right or the left in relation to the cylinder 24.

The light 14 of the position sensor 4 is used to alert a technician as to whether the piston ring compressor 2 is properly aligned, or must be tilted toward the right or the left with relation to the cylinder 24. The light 14 may also be used to determine when the contacting face 2a of the piston ring compressor 2 is in the same plane with the face of the engine block. This would be accomplished, for example, by the lights 14 blinking at a certain frequency.

Once the position sensors 4 properly and accurately align the piston ring compressor 2 with the cylinder 24, the piston assembly 12 is then slid through the piston ring compressor 2 and inserted within the cylinder 24. In this manner, the piston assembly can be inserted within the cylinder 24 without damaging either the piston assembly 12 or cylinder liner 28.

Other aspects, objects and advantages of this invention can be obtained from a study of the drawings, the disclosure and the appended claims.

What is claimed is:

1. A piston assembly insertion apparatus for inserting a piston assembly into a cylinder of an engine block, comprising:

a piston ring compressor; and at least one sensor mounted on the piston ring compressor, the at least one sensor determines whether a centerline of the piston ring compressor is aligned and is parallel with a centerline of the cylinder of the engine block, the at least one sensor being slidably mounted on the piston ring compressor.

2. The piston assembly insertion apparatus of claim 1, wherein the at least one sensor determines whether the piston assembly is tilted either left of the cylinder or right of the cylinder.

3. The piston assembly insertion apparatus of claim 1, wherein the at least one sensor is a linear variable distance transducer.

4. The piston assembly insertion apparatus of claim 1, wherein the at least one sensor includes a mechanism for indicating when the centerline of the piston ring compressor is aligned with the centerline of the cylinder.

5. The piston assembly insertion apparatus of claim 3, wherein the mechanism is a light.

6. The piston assembly insertion apparatus of claim 1 adapted for use with an engine block.

7. A piston assembly insertion apparatus for inserting a piston assembly into a cylinder of an engine block, comprising:

a piston ring compressor;

at least one sensor mounted on the piston ring compressor, the at least one sensor determines whether a centerline of the piston ring compressor is aligned and is parallel with a centerline of the cylinder of the engine block; and a proximity sensor mounted to the piston ring compressor, the proximity sensor determining a distance between the piston ring compressor and the engine block.

8. The piston assembly insertion apparatus of claim 7, wherein the proximity sensor is a laser sensor.

9. The piston assembly insertion apparatus of claim 8, wherein the proximity sensor determines when the piston ring compressor is in contact with the engine block prior to the piston assembly being inserted within the cylinder.

* * * * *